UNITED STATES PATENT OFFICE.

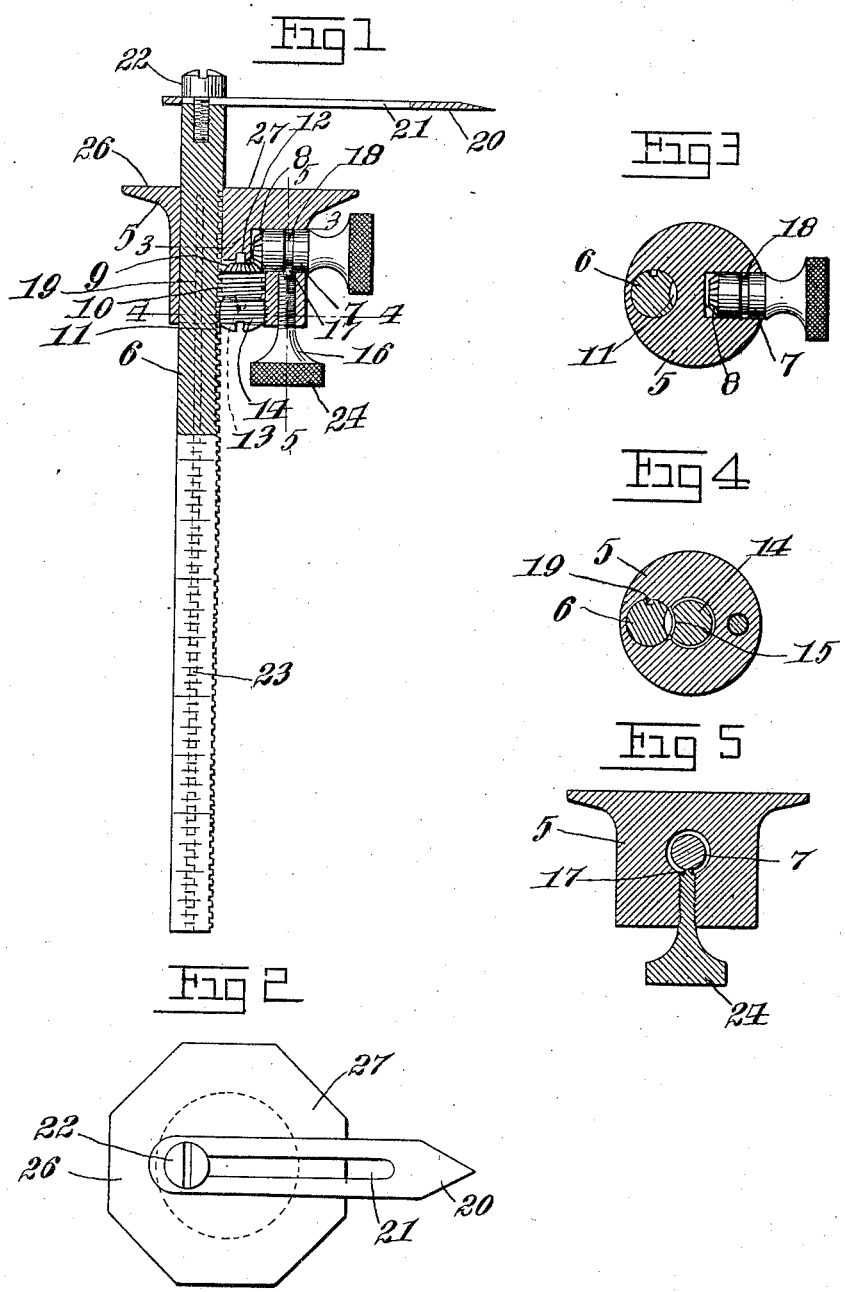

AUGUST H. WIDEN, OF BEVERLY, MASSACHUSETTS.

MARKING-GAGE.

1,040,078.   Specification of Letters Patent.   Patented Oct. 1, 1912.

Application filed August 12, 1911. Serial No. 643,742.

*To all whom it may concern:*

Be it known that I, AUGUST H. WIDEN, a citizen of the United States, residing at Beverly, in the county of Essex and State of Massachusetts, have invented new and useful Improvements in Marking-Gages, of which the following is a specification.

The general object of the invention is to facilitate the operation of adjusting marking gages and to lock the parts in any position of adjustment.

Other objects will appear and be better understood from the following description taken in connection with the accompanying drawings, in which, Figure 1 is a side elevation partly in section. Fig. 2 is a detail plan view. Fig. 3 is a sectional plan view approximately on the line 3—3 of Fig. 1. Fig. 4 is a view similar to Fig. 3 on the line 4—4 of Fig. 1. Fig. 5 is a longitudinal section on the line 5—5 of Fig. 1.

The head 5 is adapted to slide on the bar 6 and is moved in either direction by turning the shaft 7, the toothed beveled end 8 of which meshes with the toothed beveled end 9 of a worm pinion 10, the thread on the said pinion meshing with the rack teeth 11 on the bar 6. The pinion 10 has a suitable bearing such as shown at 12 in the head 5 and also has a bearing as shown at 13 in a threaded plug 14 screwed into the head 5 and serving to retain the pinion therein. The screw 14 also has a curved depression 15 which affords a clearance for the rack teeth 11 of the bar 6. The combined lock and retainer 16 for the operating shaft 7 screws into the head 5 and has a reduced end portion 17 received by a circular groove 18 in the shaft 7. A tongue and slot construction 19 on the bar and head serves to prevent rotation of these parts and insures a sliding movement for the head 5. The marking tooth 20 is adapted for angular adjustment with respect to the bar and head and has a longitudinal slot 21 through which extends a set screw 22 screwed into the upper end of the bar 6 the said screw serving to secure the marking tooth in any of its adjusted positions. The bar 6 is provided with a suitable scale such as shown at 23 the divisions of which are laid off in fractional parts of inches.

In use the combined lock and retainer 16 is first turned upwardly by turning the head 24 thereof, for a distance sufficient to permit free rotation of the shaft 7 but not far enough to disengage from the groove 18 thereof. The shaft 7 may then be rotated by turning the milled head 25 thereof whereupon the pinion 10 will be rotated which, by virtue of its engagement with the rack teeth 11, will slide the head on the bar 6. After the head has been moved to the required distance from the tooth 20 the combined lock and retainer 16 is turned until the inner end 17 thereof binds on the floor of the groove 18 sufficiently hard to prevent accidental turning movement of the shaft 7. When the parts are so positioned the head 5 will be securely locked in its adjusted position. It will be further manifest that, by virtue of the worm gear connection between the head and bar, the said head will at all times be held against sliding movement on the bar until the pinion 10 is rotated as previously described, the locking effect produced by the member 16 being chiefly to prevent accidental turning of the operating shaft 7 when the device is laid to one side after marking, or by the operator's hand slipping during the marking operation.

The device may be constructed of metal throughout or various parts thereof may be of different materials best suited for the purpose, the working surface, or that to be presented to the work, of the head 5 being preferably plane throughout.

By rendering the marking tooth adjustable the operation of marking on work provided with beveled or curved edges will be facilitated by reason of permitting the bearing surface of the head 5 to be adjusted completely across a curved or beveled surface after which the marking tooth may be adjusted so as to bear on the surface to be marked. Either end of the marking tooth may be provided with a sharpened edge and by arranging the bar receiving opening in the head 5 to one side of the axis thereof, relatively short and long bearing surfaces 26 and 27 will be provided, the former of which is adapted for marking work, the surfaces of which are at right angles to each other, while the longer side is better adapted for marking work whose edges are curved, oblique or beveled.

The foregoing, of course, is merely illustrative of one embodiment of the invention and it is to be understood that I am not to be limited to the structure illustrated in the drawings and herein described, since various changes may be made, in the scope of the appended claim without departing from the spirit or sacrificing any of the advantages of the invention.

What I claim as new is:

In a marking gage, the combination of a toothed bar provided at one end with a marker, a head having a plurality of recesses and adapted to slide on the toothed bar, a worm pinion arranged in one of the recesses of the head and meshing with the teeth of the bar and having a toothed beveled surface, a screw screwed into the recess and confining the worm pinion therein, a grooved shaft journaled in another recess in the head and at right angles to the pinion and having a beveled surface provided with teeth meshing with the teeth of the pinion, and an adjusting screw screwed into the head and adapted to enter the groove of the shaft and hold the same against longitudinal movement and further adapted when turned in one direction to bind on the surface of the groove of the shaft, for the purpose set forth.

In testimony whereof I affix my signature in presence of two witnesses.

AUGUST H. WIDEN.

Witnesses:
ANTON AKESON,
ANTHONY P. HOPKINS.

Copies of this patent may be obtained for five cents each, by addressing the "Commissioner of Patents, Washington, D. C."